A. H. TAIT.
Apparatus for Preserving Meat, Fish and Vegetables.
No. 162,119.    Patented April 13, 1875.
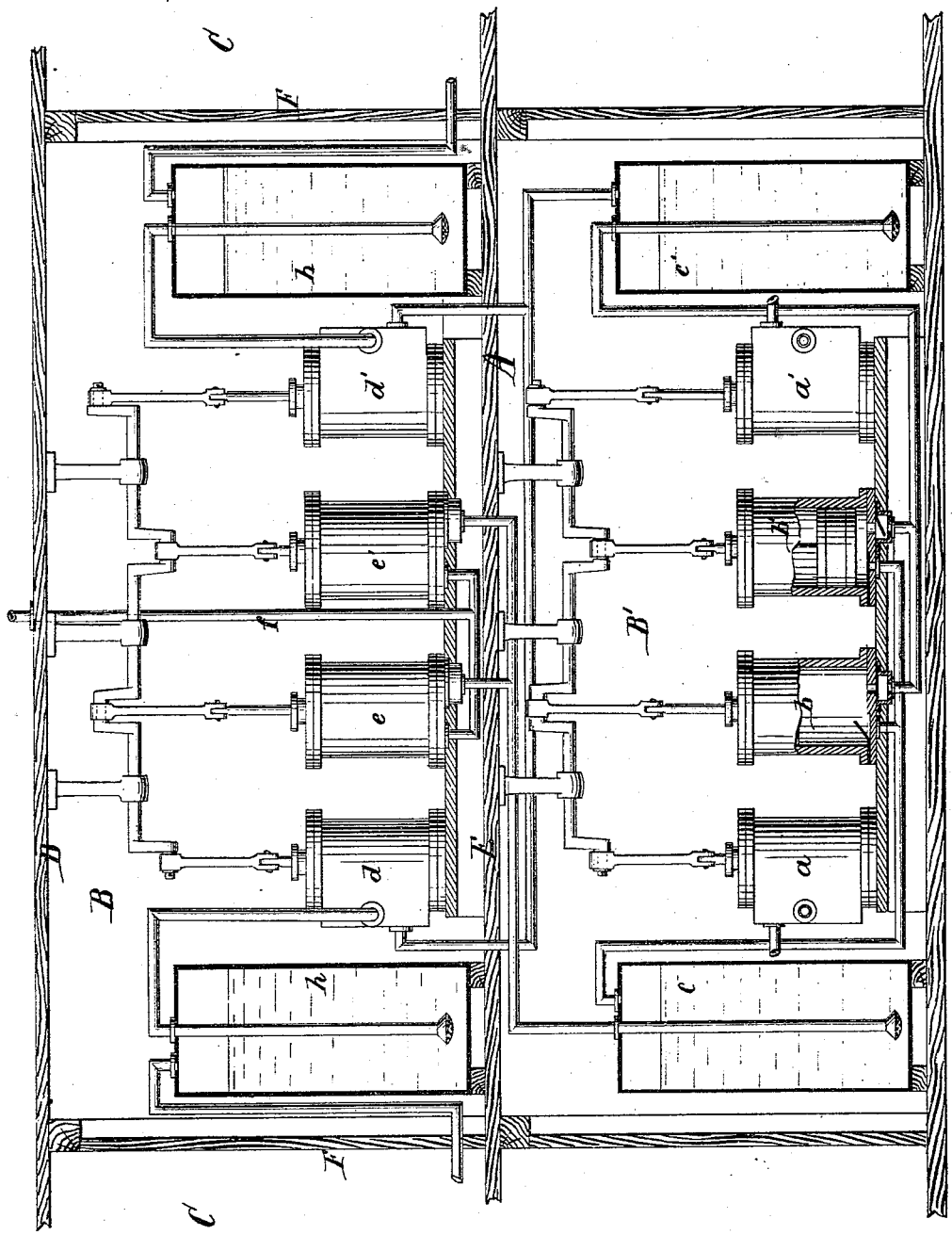
Witnesses:
Inventor:
Augustus H. Tait
Van Santvoord & Hauff
Attys

UNITED STATES PATENT OFFICE.

AUGUSTUS H. TAIT, OF JERSEY CITY, NEW JERSEY.

IMPROVEMEMT IN APPARATUS FOR PRESERVING MEAT, FISH, AND VEGETABLES.

Specification forming part of Letters Patent No. 162,119, dated April 13, 1875; application filed November 13, 1874.

*To all whom it may concern:*

Be it known that I, AUGUSTUS H. TAIT, of Jersey City, in the county of Hudson and State of New Jersey, have invented a certain new and Improved Apparatus for Preserving Meat, Fish, and Vegetables, of which the following is a specification:

The drawing represents a longitudinal vertical section.

This apparatus consists of one or more air force-pumps driven by steam-cylinders and serving to compress air into a washer partly filled with a solution of chloride of sodium or other suitable chemicals, in combination with expansion air-cylinders, which serve to impart motion to one or more air force-pumps, serving to compress atmospheric air into a washer, from which it passes to the first set of air force-pumps, while the air which exhausts from the air-expansion cylinders is allowed to expand in drums containing bisulphite of lime, or crude pyroligneous acid, or other suitable antiseptics, and after having been impregnated with such antiseptics, the air which is cooled by its final expansion to from 33° to 36° Fahrenheit escapes into the provision-chamber for the purpose of keeping meat, fish, or vegetables in a fresh state for market.

In the example shown by the drawing, my apparatus is shown in its application to a vessel intended for the transportation of meat, fish, or vegetables from a distant seaport; but I will here remark that my apparatus is intended, also, for store-houses so erected that the provisions can be stored and preserved ready to be received by the vessels, and on being discharged from said vessels the provisions are received in similar store-houses, whence they are finally brought on the market.

In the drawing, the letter A designates a vessel which is built with a compartment, B, between the upper deck D and the main deck E, and with another compartment, B', below the main deck, for the reception of my apparatus. The compartment B is separated from the provision-chambers C C by bulk-heads F F.

My apparatus consists of two steam-cylinders, $a$ $a'$, which receive steam from a boiler, (not shown in the drawing,) and which serve to impart motion to two air force-pumps, $b$ $b'$. These pumps are single-acting, and they are kept cool by cold-water jackets or other suitable means. They take the air from a tank, $c$, and compress it into another tank, $c'$, the tank $c$ containing air under pressure of from thirty to forty pounds to the square inch, while the air in the tank $c'$ is compressed to a pressure of from sixty to eighty pounds. From the tanks $c$ $c'$ the compressed air passes to the air-expansion cylinders $d$ $d'$, which serve to impart motion to air force-pumps $e$ $e'$. These force-pumps are similar to the pumps $b$ $b'$, but they take the air through a pipe, $f$, from the external atmosphere, and compress it in the tank $c$ to a pressure of from thirty to forty pounds. The air which exhausts from the expansion-cylinders $d$ $d'$ passes into the drums $h$ $h'$, and, as it expands, its temperature is raised to from 33° to 36° Fahrenheit. The tanks $c$ $c'$ are partly filled with salt water and the drums $h$ $h'$ contain each a quantity of crude pyroligneous acid or a solution of bisulphite of lime or any other suitable antiseptics. From the drums $h$ $h'$ the air passes into the provision-chambers C C, whence it escapes either into the open atmosphere or into the stoke-hole of the boiler.

In order to preserve meat, fish, or vegetables to perfection, it is necessary, first, that the temperature to which said provisions are exposed shall not exceed 36° Fahrenheit; second, that there be a constant current of pure fresh air at that temperature; third, that such air be purified from all extraneous matter, which tends to set up putrefaction on the nitrogenous constituents of the provisions; fourth, that the hygrometric state of the air passing through the provision-chamber shall be properly gaged; fifth, that the current of cold air passing into and through the provision-chamber, particularly for the purpose of preserving meat, shall be impregnated with suitable antiseptics. All these conditions are fulfilled by my apparatus.

As the air passes through the salt water contained in the tanks $c$ $c'$ it is freed from sporules or germs of putrefaction, which are mixed with the same at all times to a greater or less degree, and at the same time the air takes up sufficient moisture, so that the same, when brought in contact with the provisions, will not spoil their fresh appearance, and particularly not diminish the weight of the meat. Finally, by means of the antiseptics contained in the drums $h\ h'$, the air is brought in such a condition that it does not spoil the appearance of the provisions to be preserved.

What I claim as new, and desire to secure by Letters Patent, is—

An apparatus for preserving meat, fish, and vegetables, composed of one or more air-pumps, $b\ b'$, tanks $c\ c'$, each containing a quantity of salt water, one or more expansion air-cylinders, $d\ d'$, air-pumps $e\ e'$, and drums $h\ h'$, each containing crude pyroligneous acid, the air escaping from these drums being passed through the provision-chambers C C, all combined and operating substantially in the manner and for the purpose herein shown and described.

In testimony that I claim the foregoing I have hereunto set my hand and seal this 12th day of November, 1874.

A. H. TAIT. [L. S.]

Witnesses:
   W. HAUFF,
   CHAS. WAHLERS.